United States Patent [19]

Redlich et al.

[11] Patent Number: 4,881,133
[45] Date of Patent: Nov. 14, 1989

[54] ARRANGEMENT FOR THE RECORDING OF AN INFORMATION SIGNAL

[75] Inventors: Horst Redlich; Gunter Joschko, both of Berlin, Fed. Rep. of Germany

[73] Assignee: DMM Master Technik GmbH fur Informationstrager, Fed. Rep. of Germany

[21] Appl. No.: 79,421

[22] Filed: Jul. 30, 1987

[30] Foreign Application Priority Data

Aug. 2, 1986 [DE] Fed. Rep. of Germany ....... 3626021

[51] Int. Cl.$^4$ ...................... H04N 1/23; G01D 15/16
[52] U.S. Cl. ................................ 358/299; 346/139 C
[58] Field of Search ...................... 30/164.9; 101/150; 219/83, 229; 346/139 C; 369/173; 358/299

[56] References Cited

U.S. PATENT DOCUMENTS

| | | | |
|---|---|---|---|
| 2,238,601 | 10/1939 | Reynolds | 358/299 |
| 2,773,163 | 9/1953 | Boyajean | 346/139 C |
| 4,044,379 | 8/1977 | Halter | 358/128 |

FOREIGN PATENT DOCUMENTS 2629492 10/1981 Fed. Rep. of Germany .
3527606 7/1986 Fed. Rep. of Germany .

OTHER PUBLICATIONS

U.S. patent application Ser. No. 883,629 filed Jul. 9, 1986.

Primary Examiner—E. A. Goldberg
Assistant Examiner—Scott Rogers
Attorney, Agent, or Firm—Burns, Doane, Swecker & Mathis

[57] ABSTRACT

An arrangement for the recording of a digital information signal, in particular onto a plate-shaped, metallic recording carrier with the aid of a penetrating element is specified, in which the latter preferably has a pyramid shape with three side surfaces and three edges. The edge (6) forming the runner of the penetrating element lies, in its projection onto the recording carrier, in the direction of the velocity vector at the point of recording. The edge forms with the velocity vector an angle of >135°. The projections of the two further edges onto the recording carrier lie perpendicular to the velocity vector. With the aid of such a penetrating element, an engraving of a digital signal is possible, which is read out by a laser beam.

2 Claims, 1 Drawing Sheet

ARRANGEMENT FOR THE RECORDING OF AN INFORMATION SIGNAL

BACKGROUND OF THE INVENTION

The invention relates to an arrangement for the recording of an information signal, in particular onto a plate-shaped, metallic recording carrier.

The cutting of an analog information signal into the surface of a plate-shaped recording carrier with the aid of a cutting stylus is known. The original cutting into a lacquer film has been replaced increasingly in recent years by cutting into a metallic recording carrier. This has increased the fidelity of shape of the cut-in groove and also eliminated several intermediate stages in the production of a phonographic record.

At the same time, digital sound and data recording, in which an information item is recorded onto a recording carrier by complicated optical and chemical processes with the aid of a laser beam and read out by a laser beam, is gaining increasingly in significance. Although this type of recording is distinguished by particularly good acoustic characteristics and improved handling of the finished recording carrier, the production of such a so-called CD (compact disc) is far more complicated than analog recording with the aid of a cutting stylus.

German Patent Specification 3,527,606 discloses a process for the recording of a digital information signal, in particular an audio signal in CD format, in which the signal is located, with the aid of an engraving stylus driven perpendicular to the recording carrier, between two successive indentations of the signal to be recorded above, and in the indentations beneath the undeformed surface of the recording carrier.

With the aid of this known process, the recording of a purely digital signal, the informational content of which is determined by the length and the spacing of two successive indentations on the recording carrier, is basically possible.

It is known that optical scanning systems evaluate diffraction patterns of the surface structure. It has been shown that the laser scanner standardized for the compact disc also detects signals from surface structures produced non-rectangularly in cross-section.

OBJECTS AND SUMMARY OF THE INVENTION

The invention is therefore based on the object of specifying an arrangement for the recording of an information signal which is recorded in the form of individual successive indentations on the recording carrier, which arrangement makes possible, with the use of a penetrating element, the creation of such a signal track on the recording carrier, which serves as the preliminary stage for a recording carrier disc which can be scanned with a laser. The invention is further based on the object of specifying the design of a penetrating element which, during the engraving operation, does not cause any recording distortions which would lead to signal disturbances during scanning with a laser beam.

The penetrating element according to the invention, which is used as engraving stylus, is designed in an implemented arrangement as an oblique-angled pyramid, the one side surface of which is aligned at right angles to the running direction of the recording carrier and parallel to the direction of excitation of the stylus. The side edges of this surface thereby determine the lateral flank angles of the recorded signal indentation sequence. When using the penetrating element as engraving stylus, no chips are produced. The engraved recording carrier can therefore already be checked directly after production by scanning with the aid of a laser. The preferred angles of the stylus edges in the arrangement according to the invention have the effect that neither intermodulations, time shifts, nor entry and exit distortions occur, which wuld produce a signal falsification during reading out of the information carrier.

The penetrating element according to the invention is simple to produce. No laser beam is necessary for recording of the information signal and the recording can take place under the usual conditions of the record industry, i.e. no super-clean conditions are necessary, such as those which have to be required for laser recording.

The invention will be explained in more detail below with reference to an exemplary embodiment.

DETAILED DESCRIPTION OF THE PREFERRED EMBODIMENT

Figure 1:
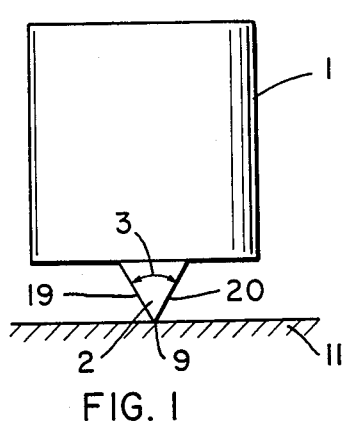
FIG. 1 shows an arrangement in rear view.

FIG. 1 shows a positioning element 1, which carries a penetrating element 2 on an underside. The positioning element is, for example, a piezoelectric resonator to which the penetrating element 2 is fixed. The layout of such an arrangement is known, for example, from German Patent Specification 3,527,606.

The penetrating element preferably consists of diamond and has a triangular base area, which is fixed to the positioning element. The pyramid shape of the penetrating element is designed obliquely angled such that the projections of two edges 19 and 20 to the recording carrier form a right angle with the velocity vector of the recording carrier $\vec{V}_r$. The side surface formed by the edges 19 and 20 is arranged parallel to the direction of excitation and at right angles to the recording direction. The two edges 19 and 20 determine the lateral flank angle of the recorded signal track.

It has been shown that the laser scanner standardized for the compact disc detects signals from the signal structure produced according to the invention, which signals have the same modulation depth as from structures which satisfy the $\lambda/4$ condition previously assumed to be necessary. The edges 19 and 20 therefore preferably converge to a tip 9 which, in the neutral mode of the penetrating element, rests on the surface of the information carrier. In the working mode, the penetrating element engraves single indentations with uniform depth into the surface of the recording carrier, this depth preferably being approximately 0.2 $\mu$. Between two indentations, the tip 9 of the penetrating element projects to such an extent that it is just at the surface of the recording carrier.

Figure 2:
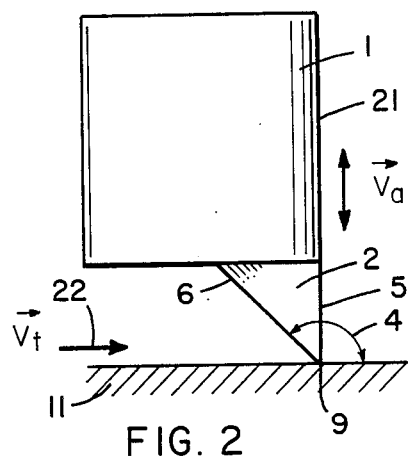
FIG. 2 shows an arrangement in side view.

FIG. 2 shows the arrangement according to the invention from the side. It is illustrated that the front surface 5 is at right angles to the velocity vector and thus to the running direction of the information carrier 11. The two other sides 7 and 8 of the penetrating element 2 converge into an edge 6, which forms the runner of the penetrating element. During recording, this runner is at an angle α (4) to the recording carrier. The angle α must be greater than 135°, as chipless deformation is only achieved under this condition. However, it should not be greater than 150°-155° in order to produce sufficient levels. The possible range of variation of the angle is therefore only approximately 20°.

In engraving operation, the recording carrier runs past the penetrating element 2 in the direction of the velocity vector 22. Upon excitation of the penetrating element 2 perpendicular to the surface of the recording carrier, the runner 6 enters the recording carrier and shapes at the edges 19 and 20 of the surface 5 the side flanks of the indentation to be recorded.

In order that the runner 6 does not induce any signal falsification during exiting of the penetrating element from the recording carrier, a certain clearance angle is necessary. Therefore, the condition $$|tg\,\alpha| > \frac{|\vec{V_a}|}{|\vec{V_t}|}$$

must be satisfied, where $|\vec{V_a}|$ represents the velocity component of the tip perpendicular to the recording carrier and $|\vec{V_t}|$ represents the velocity vector of the recording carrier at the point of recording.

In order that the front surface 5, and thus the edges 19 and 20, can be repolished in an easy way in the case of wear phenomena, without having to remove the penetrating element from the positioning element 1, one generatrix 21 lies in the plane of the front surface 5. This makes polishing of the penetrating element possible in the state of being solidly connected to the positioning element 1.

Figure 3:
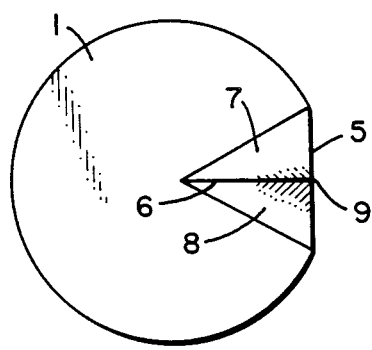
FIG. 3 shows an arrangement in plan view.

FIG. 3 shows the arrangement according to the invention in plan view. The penetrating element has an approximately triangular base area. The projections of the edges 19 and 20 lie at right angles to the velocity vector $\vec{V_t}$ at the surface of the recording carrier at the point of recording. The two side surfaces 7 and 8 of the penetrating element converge at the runner 6, which runs from the base area to the tip 9 of the penetrating element and the projection of which to the surface of the recording carrier is at right angles to the projection of the edges 19 and 20.

Figure 4:
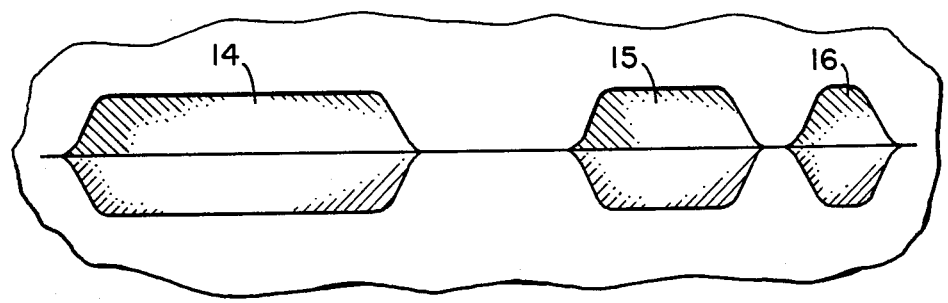
FIG. 4 shows a signal sequence on the recording carrier.

FIG. 4 shows a signal track produced by the arrangement according to the invention. Single indentations 14, 15 and 16 are illustrated. The shape of these indentations remains essentially unchanged along the individual indentations. The exiting of the engraving stylus from the indentations takes place to such an extent that the vertex of the path of movement of the tip 9 of the penetrating element goes up as far as the surface, so that no engraving of signal information takes place between two indentations. The indentation 15 shows the recording at the limit frequency of the positioning element and is therefore sinusoidal. Pulses of lower repetition frequency are recorded in the entry and exit region corresponding to the limit frequency conditions.

Figure 5:
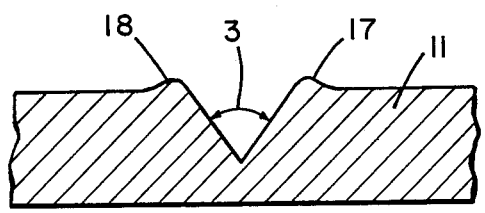
FIG. 5 shows a cross-sectional view of an engraved information track.

FIG. 5 shows the view of an indentation in cross-section. Such an indentation is created by an engraving stylus, which results in two elevations 17 and 18 occurring at the side of the indentations. However, these so-called "ears" are of no further disturbance as they are not cast during further processing of the recording carrier and reproduction by means of transfer modling, so that the finished recording carrier does not include these "ears". These ears are likewise no disturbance in the direct reading-out of the recording carrier with the aid of a laser beam, as these ears only have an effect on the signal amplitude, to be read out. Owing to the absence at this stage of a cover layer on the recording carrier just cut, a different laser frequency must in any case be used, so that an adaptation which can lead to achieving an adequately high amplitude can readily be carried out here. The flank angle 3 between the lateral flanks of the indentation is approximately 60°-80°. This is sufficient to cause corresponding diffraction effects, which make reading-out possible with the aid of a laser beam. The angle 3 corresponds to the angle β between the edges 19 and 20 of the front surface 5 of the penetrating element 2.

As, in the case of a finished recording carrier, the read-out light falls vertically onto the surface of the recording carrier, a flank angle of the front surface 5 relative to the recording carrier deviating from the perpendicular causes frequency intermodulations. Although theoretically these can be electronically equalized, such electronic time correction measures can be obviated if the front surface is arranged relative to the recording carrier in the same direction as the light beam of the read-out signal relative to the recording carrier.

The arrangement according to the invention makes digital recording possible by engraving into a metallic recording carrier, from which copies can be made directly. This dispenses with all stages of development, silvering etc., such as are necessary in the case of recording the digital signal with the aid of a laser into a photosensitive layer.

By corresponding smoothness of the penetrating element, the flank angles of the recorded indentations can be maintained very accurately. The extensive corrections necessary for this in the case of laser recording can be dispensed with entirely.

| List of reference numbers | |
|---|---|
| 1 | Positioning element |
| 2 | Penetrating element |
| 3 | Angle β |
| 4 | Angle α |
| 5 | Front surface |
| 6 | Runner |
| 7 | Side surface |
| 8 | Side surface |
| 9 | Tip |
| 11 | Recording carrier |
| 14 | Signal track |
| 15 | Signal track |
| 16 | Signal track |
| 17 | Elevation |
| 18 | Elevation |
| 19 | Edge |
| 20 | Edge |
| 21 | Generatrix |
| 22 | Velocity vector $\vec{V_t}$ |

We claim:

1. Apparatus for the recording of an information signal in which the information signal is engraved into the information carrier surface by a penetrating element to produce individual successive indentations comprising:

a plate-shaped, metallic recording carrier, having a recording plane and a velocity vector $\vec{V_t}$ during recording; and a penetrating element having a pyramid shape with at least a first edge, a second edge and a third edge which converge at a tip to penetrate the surface of the recording carrier during engraving, said first edge being arranged such that its projection into the recording plane lies in the direction of the velocity vector $\vec{V_t}$ of the recording carrier, said first edge forming with the velocity vector $\vec{V_t}$ an angle $\alpha$ which satisfies the condition:

$$180° - \text{arc tangent} \frac{|\vec{V_a}|}{|\vec{V_t}|} > \alpha > 135°$$

where $\vec{V_a}$ is the velocity component of the tip perpendicular to the recording plane, and the projections of said second and third edges into the recording plane lie perpendicular to the direction of the velocity vector $\vec{V_t}$, said penetrating element being fixed on an approximately circular positioning element wherein one generatrix of the approximately circular positioning element lies in the plane given by said second and third edges of said penetrating element and wherein said second and third edges can be easily polished without removal of said penetrating element from said positioning element.

2. Apparatus for the recording of an information signal in which the information signal is engraved into the information carrier surface by a penetrating element to produce individual successive indentations comprising:

a plate-shaped, metallic recording carrier, having a recording plane and a velocity vector $\vec{V_t}$ during recording; and a penetrating element having a pyramid shape with at least a first edge, a second edge and a third edge which converge at a tip to penetrate the surface of the recording carrier during engraving, said first edge being arranged such that its projection into the recording plane lies in the direction of the velocity vector $\vec{V_t}$ of the recording carrier, said first edge forming with the velocity vector $\vec{V_t}$ an angle $\alpha$ which satisfies the condition:

$$180° - \text{arc tangent} \frac{|\vec{V_a}|}{|\vec{V_t}|} > \alpha > 135°$$

where $V_a$ is the velocity component of the tip perpendicular to the recording plane, and the projections of said second and third edges into the recording plane lie perpendicular to the direction of the velocity vector $\vec{V_t}$, wherein the included angle between said second and third edges is 60°–80°, said penetrating element being fixed on an approximately circular positioning element wherein one generatrix of the approximately circular positioning element lies in the plane given by said second and third edges of said penetrating element and wherein said second and third edges can be easily polished without removal of said penetrating element from said positioning element.

* * * * *

UNITED STATES PATENT AND TRADEMARK OFFICE
CERTIFICATE OF CORRECTION

PATENT NO. : 4,881,133
DATED : November 14, 1989
INVENTOR(S) : Horst Redlich et al.

It is certified that error appears in the above-identified patent and that said Letters Patent is hereby corrected as shown below:

Abstract, line 6, delete "(6)".

Column 4, line 61, delete "$V_t$" and insert therefor --$\vec{V_t}$--.

Column 6, line 19, delete "$V_a$" and insert therefor --$\vec{V_a}$--.

Signed and Sealed this

Twenty-third Day of October, 1990

Attest:

HARRY F. MANBECK, JR.

*Attesting Officer*   *Commissioner of Patents and Trademarks*